(12) United States Patent
Asakura et al.

(10) Patent No.: US 8,544,356 B2
(45) Date of Patent: Oct. 1, 2013

(54) BALL SCREW UNIT AND ELECTRIC POWER STEERING APPARATUS

(75) Inventors: Toshihiro Asakura, Chiryu (JP); Takashi Hara, Toyokawa (JP)

(73) Assignee: JTEKT Corporation, Osaka-Shi (JP)

( * ) Notice: Subject to any disclaimer, the term of this patent is extended or adjusted under 35 U.S.C. 154(b) by 431 days.

(21) Appl. No.: 12/702,461

(22) Filed: Feb. 9, 2010

(65) Prior Publication Data
US 2010/0206656 A1 Aug. 19, 2010

(30) Foreign Application Priority Data

Feb. 13, 2009 (JP) ................................ 2009-031407
Jun. 19, 2009 (JP) ................................ 2009-146667

(51) Int. Cl.
*F16H 1/24* (2006.01)
*F16H 55/02* (2006.01)

(52) U.S. Cl.
USPC ...................... 74/424.82; 74/424.87; 180/444

(58) Field of Classification Search
USPC ................. 74/89.44, 424.82, 424.86, 424.87; 384/45
See application file for complete search history.

(56) References Cited

U.S. PATENT DOCUMENTS

| | | | |
|---|---|---|---|
| 3,850,046 A | 11/1974 | Nilsson | |
| 6,176,149 B1 * | 1/2001 | Misu | 74/424.82 |
| 7,234,368 B1 * | 6/2007 | Lin et al. | 74/89.44 |
| 7,284,634 B2 * | 10/2007 | Tatewaki et al. | 180/444 |
| 7,845,251 B2 * | 12/2010 | Wu | 74/424.86 |
| 8,127,884 B2 * | 3/2012 | Asakura et al. | 180/444 |
| 2003/0192388 A1 | 10/2003 | Nagai et al. | |
| 2005/0126324 A1 * | 6/2005 | Yang et al. | 74/424.86 |
| 2005/0235766 A1 * | 10/2005 | Ohkubo | 74/424.82 |
| 2007/0006676 A1 * | 1/2007 | Mizuhara et al. | 74/424.86 |
| 2008/0295630 A1 * | 12/2008 | Chen et al. | 74/424.87 |
| 2009/0255752 A1 | 10/2009 | Asakura et al. | |
| 2010/0206656 A1 * | 8/2010 | Asakura et al. | 180/444 |
| 2011/0296939 A1 * | 12/2011 | Kaneko et al. | 74/424.87 |

FOREIGN PATENT DOCUMENTS

| | | |
|---|---|---|
| DE | 3635212 A1 | 4/1988 |
| DE | 10 2007 032 012 A1 | 1/2009 |
| JP | A 05-10412 | 1/1993 |
| JP | A 2004-003631 | 1/2004 |

(Continued)

OTHER PUBLICATIONS

European Office Action issued in European Patent Application No. EP 10153321.4 dated Jun. 15, 2010.

(Continued)

*Primary Examiner* — Troy Chambers
*Assistant Examiner* — Alexander Vu
(74) *Attorney, Agent, or Firm* — Oliff & Berridge, PLC

(57) ABSTRACT

A fitting recess portion that connects fitting holes to each other is formed in a peripheral face of a ball screw nut. A circulation member includes a pair of fitted portions that are fitted in the fitting holes, and a connecting portion that provides communication between the fitted portions. A communication groove that has an opening on the fitted end side of the connecting portion and that extends in the axial direction is formed in the connecting portion. When the connecting portion is fitted in the fitting recess portion and the opening of the communication groove formed in the connecting portion is blocked by a bottom portion of the fitting recess portion, a second path that forms a return path together with first paths formed in the fitted portions is formed.

18 Claims, 11 Drawing Sheets

(56) References Cited

FOREIGN PATENT DOCUMENTS

| | | |
|---|---|---|
| JP | A-2004-225808 | 8/2004 |
| JP | A 2005-069264 | 3/2005 |
| JP | A 2006-132689 | 5/2006 |
| JP | 2006-256414 | 9/2006 |
| JP | 2006256414 A * | 9/2006 |
| JP | A-2006-256414 | 9/2006 |
| JP | 2007078093 A * | 3/2007 |
| JP | A-2007-78093 | 3/2007 |

OTHER PUBLICATIONS

U.S. Appl. No. 12/695,731, filed Jan. 28, 2010.
Apr. 16, 2013 Notice of Reasons for Rejection issued in Japanese Patent Application No. 2009-146667 (with English-language translation).

* cited by examiner

BALL SCREW UNIT AND ELECTRIC POWER STEERING APPARATUS

INCORPORATION BY REFERENCE

The disclosure of Japanese Patent Applications No. 2009-031407 and No. 2009-146667 respectively filed on Feb. 13, 2009 and Jun. 19, 2009, each including the specification, drawings and abstract, are incorporated herein by reference in their entireties.

BACKGROUND OF THE INVENTION

1. Field of the Invention

The invention relates to a ball screw unit and an electric power steering apparatus.

2. Description of the Related Art

For example, Japanese Patent Application Publication No. 2006-256414 describes a rack-assist electric power steering apparatus (EPS) that includes a hollow shaft in which a rack shaft is inserted and which is rotated by a driving motor, and that converts rotation of the hollow shaft into reciprocation of the rack shaft using a ball screw unit, thereby supplying an assist force to a steering system.

In such an EPS, the ball screw unit is formed by arranging a plurality of balls that serve as rolling elements in a spiral rolling-element path formed by aligning a thread groove formed in an outer periphery of the rack shaft with a thread groove formed in an inner periphery of a ball screw nut.

When being arranged in the rolling-element path, the balls are interposed between the rack shaft and the ball screw nut. When the ball screw nut rotates relative to the rack shaft, each ball rolls within the rolling-element path while receiving a load. The ball screw unit has a return path that serves as a shortcut between two points set within the rolling-element path, that is, an upstream-side point and a downstream-side point. The balls that have rolled through the rolling-element path pass through the return path to be returned from the downstream-side point to the upstream-side point.

Each of the balls that roll within the rolling-element path is infinitely circulated through the return path, whereby the ban screw unit converts rotation of the ball screw nut into axial movement of the rack shaft. JP-A-2006-256414 describes the EPS that is configured to convert a motor torque into an axial assist force and transmit the assist force to the rack shaft when the ball screw nut fixed to an inner periphery of a motor shaft rotates together with the motor shaft.

Downsizing of components of an EPS has been strongly demanded. In order to downsize components of an EPS, a configuration in which a return path is formed by fitting a circulation member in fitting holes that pass through a ball screw nut in the radial direction is usually adopted in a ball screw unit for the EPS.

For example, as described in JP-A-2007-78093, a pair of fitting holes corresponding to two points set within a rolling-element path and a return hole that passes through a ball screw nut in its axial direction and that crosses each fitting hole are formed in the ball screw nut. A circulation member that is fitted in the fitting holes connects the return hole to the rolling-element path, whereby a return path is formed.

However, in the configuration in which the return path is formed by the circulation member that is fitted in the fitting holes, it may be difficult to properly fit the circulation member in the fitting holes. If an error in a fitting position of the circulation member occurs due to, for example, inclination of the circulation, member that may be caused when the circulation member is fitted, a step is formed in a connection portion between the circulation member and the fitting hole within the return path. This step may hinder smooth circulation of the balls within the return path, and abnormal noise or vibration may be generated.

In order to properly fit the circulation member in the fitting holes, in the ball screw unit described in JP-A-2007-78093, a positioning pin is formed on the circulation member, and a positioning hole corresponding to the positioning pin is formed on the fitting hole side. In the fitting hole, there is formed an engagement groove in which a C-shaped ring that forms an engagement element is fitted. Because the positioning pin is fitted in the positioning hole, it is possible to assure proper fitting of the circulation member. In addition, because the circulation member is restrained by the C-shaped ring that is fitted in the engagement groove, it is possible to suppress occurrence of displacement of the circulation member after fitting of the circulation member.

However, a ball screw unit used in an EPS is a compact member. Therefore, the above-described positioning pin and C-shaped ring are considerably small members, and the positioning hole and engagement groove corresponding to the positioning pin and C-shaped ring are also considerably small. Due to the low workability and assembling efficiency, applying this configuration to an EPS has a cost disadvantage.

SUMMARY OF THE INVENTION

It is an object of the invention to provide a ball screw unit that has a simple configuration and that allows easy and proper fitting of a circulation member, and an electric power steering apparatus that includes the ball screw unit.

A first aspect of the invention relates to a ball screw unit, including a threaded shaft that has an outer periphery in which a thread groove is formed; a ball screw nut that has an inner periphery in which a thread groove is formed; a spiral rolling-element path that is formed by aligning the thread groove of the threaded shaft with the thread groove of the ball screw nut; and a plurality of balls that are arranged within the rolling-element path. A return path that serves as a shortcut between two points set within the rolling-element path and that allows infinite circulation of each of the balls that roll within the rolling-element path is formed in the ball screw nut. The return path is formed by fitting a circulation member in a pair of fitting holes that pass through the ball screw nut in a radial direction and that are formed so as to correspond to the two points set within the rolling-element path. A fitting recess portion that connects the fitting holes to each other is formed in a peripheral face of the ball screw nut. The circulation member includes a pair of fitted portions that are fitted in the respective fitting holes, and a connecting portion that connects the fitted portions. The return path is formed of first paths that are formed by the respective fitted portions fitted in the fitting holes, and a second path that is formed by the connecting portion that is fitted in the fitting recess portion. The second path is formed when the connecting portion is fitted in the fitting recess portion so that an opening of a communication groove that is formed along an axis of the connecting portion is blocked by a bottom portion of the fitting recess portion.

If the above-described configuration, in which the circulation member fitted to the ball screw nut forms the return path, is adopted, the likelihood that a step is formed within the return path is reduced. Also, if the configuration, in which the connecting portion that connects the fitted portions is fitted in the fitting recess portion framed in the ball screw nut when the circulation member is fitted to the ball screw nut, is adopted, the range of positions that may be occupied by the fitted portions within the fitting holes is significantly limited. Thus, it is possible to suppress displacement of the fitted portions within the fitting holes due to, for example, inclination of the circulation member that may occur when the circulation member is fitted. As a result, it is possible to easily ensure proper fitting of the circulation member.

In addition, if the configuration, in which the opening of the communication groove that is formed in the connecting portion is blocked by the bottom portion of the fitting recess portion, is adopted, it is possible to suppress an increase in the thickness of the ball screw nut that may occur due to formation of the return path. Accordingly, with the configuration described above, it is possible to downsize the ball screw nut while ensuring sufficient strength of the ball screw nut to avoid deformation of the thread groove.

In the aspect described above, a pair of flanges that support each of the balls that pass through the second path may be formed at the opening of the communication groove.

With the configuration described above, an inner side space of the communication groove that is formed by the flanges is used as the second path. This inner side space is a part of the space that is formed when the opening of the communication groove is blocked by the bottom portion of the fitting recess portion. Thus, even when the fitted length of the connecting portion varies, it is possible to prevent formation of a step in a connecting place between the first path and the second path. As a result, it is possible to more effectively suppress generation of abnormal noise and vibration.

A face of each of the flanges that supports each of the balls is formed in a curved face that conforms to each of the balls.

With the configuration described above, each of the balls is able to move more smoothly. Also, because the thickness of each of the flanges is reduced from the base end portion toward the tip end, it is possible to minimize the thickness of a bottom portion that is formed due to formation of the flanges. As a result, it is possible to suppress an increase in the thickness of the ball screw nut while ensuring sufficient strength.

A position of the circulation member may be determined when the flanges contact the bottom portion of the fitting recess portion.

With the configuration described above, it is possible to more reliably determine the position of the circulation member within the fitting recess portion. As a result, it is possible to more properly fit the circulation member.

The circulation member may have a flange that contacts a perimeter of the fitting recess portion to determine a position of the circulation member.

With the configuration described above, it is possible to easily and reliably determine the position of the circulation member within the fitting recess portion. As a result, it is possible to more properly fit the circulation member.

An electric power steering apparatus may include the ball screw unit described above.

With the configuration described above, it is possible to properly fit the circulation member easily with a simple configuration, and to ensure stable operation of the ball screw unit. As a result, it is possible to provide an electric power steering apparatus in which generation of noise and vibration is suppressed and which provides excellent steering feel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Hereafter, example embodiments of the invention will be described with reference to the accompanying drawings.

Figure 1:
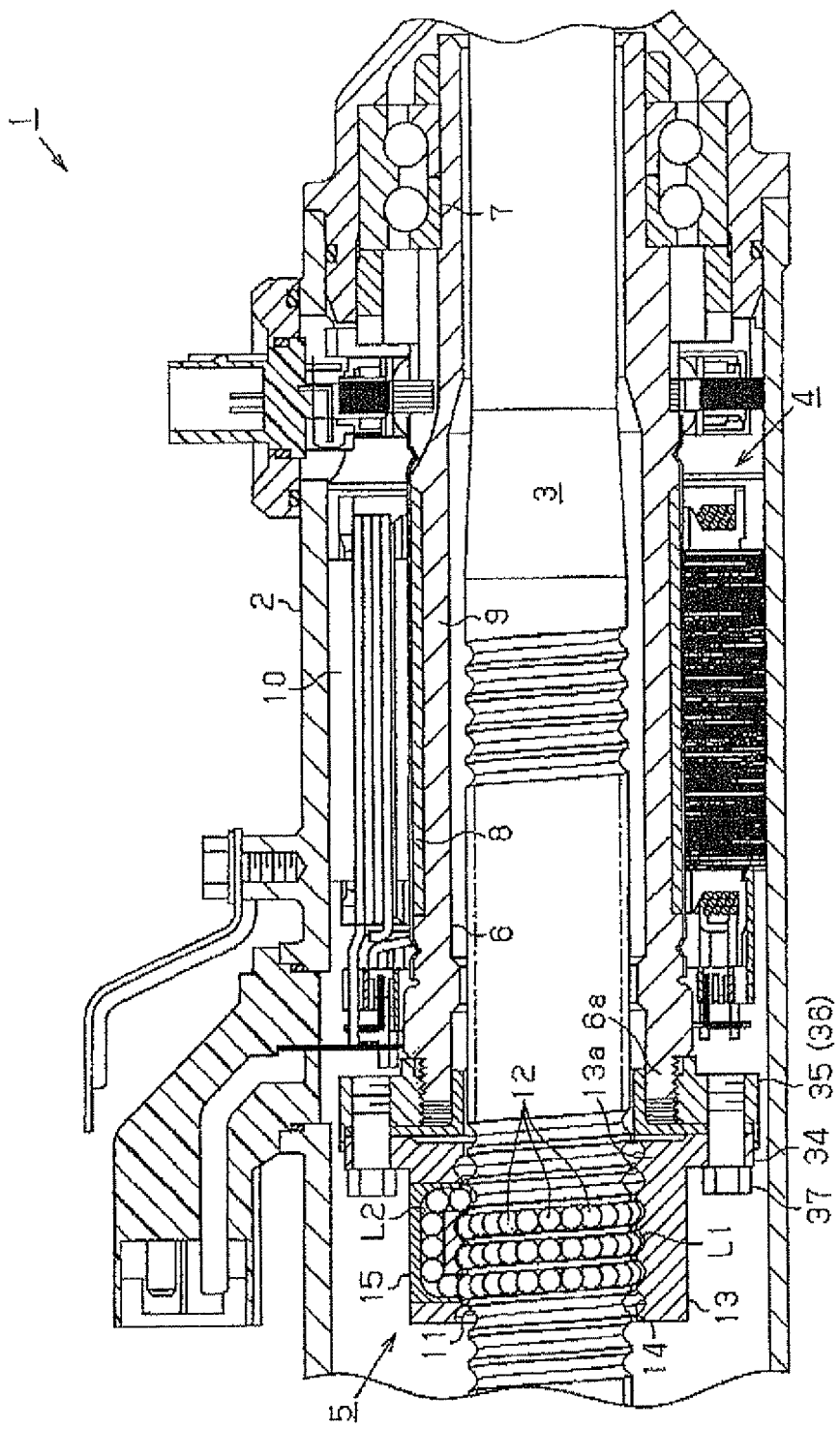
FIG. 1 is a cross-sectional view schematically showing a configuration of an electric power steering apparatus.

First, a first embodiment of the invention will be described with reference to the accompanying drawings. As shown in FIG. 1, in an electric power steering apparatus (EPS) 1 according to the first embodiment, a rack shaft 3 that is disposed in a substantially cylindrical housing 2 is supported by a rack guide and a plain bearing (both of which are not shown), and is housed and supported in such a manner that the rack shaft 3 is movable along its axial direction. The rack shaft 3 is connected to a steering shaft via a rack-and-pinion mechanism, and reciprocates along its axial direction when a steering operation is performed.

The EPS 1 includes a motor 4 that serves as a drive source, and a ball screw unit 5 that converts rotation of the motor 4 into axial movement of the rack shaft 3. The EPS 1 in the first embodiment is a rack-assist EPS in which the rack shaft 3, the motor 4 and the ball screw unit 5 are integrally housed in the housing 2.

The motor 4 has a motor shaft 6 that is a hollow shaft. The motor shaft 6 is supported by a bearing 7 provided on an inner periphery of the housing 2, whereby the motor shaft 6 is arranged along the axial direction of the housing 2. A motor rotor 9 of the motor 4 is formed by fixing a magnet 8 onto a peripheral face of the motor shaft 6. A motor stator 10 that surrounds a radially-outer side portion of the motor rotor 9 is fixed onto the inner periphery of the housing 2 and the rack shaft 3 is inserted in the motor shaft 6, whereby the motor 4 is arranged coaxially with the rack shaft 3 in the housing 2.

A thread groove 11 is formed in an outer periphery of the rack shaft 3, whereby the rack shaft 3 is formed as a threaded shaft. The ball screw unit 5 is formed by screwing a ball screw nut 13 onto the rack shaft 3 via a plurality of balls 12.

Figure 2:
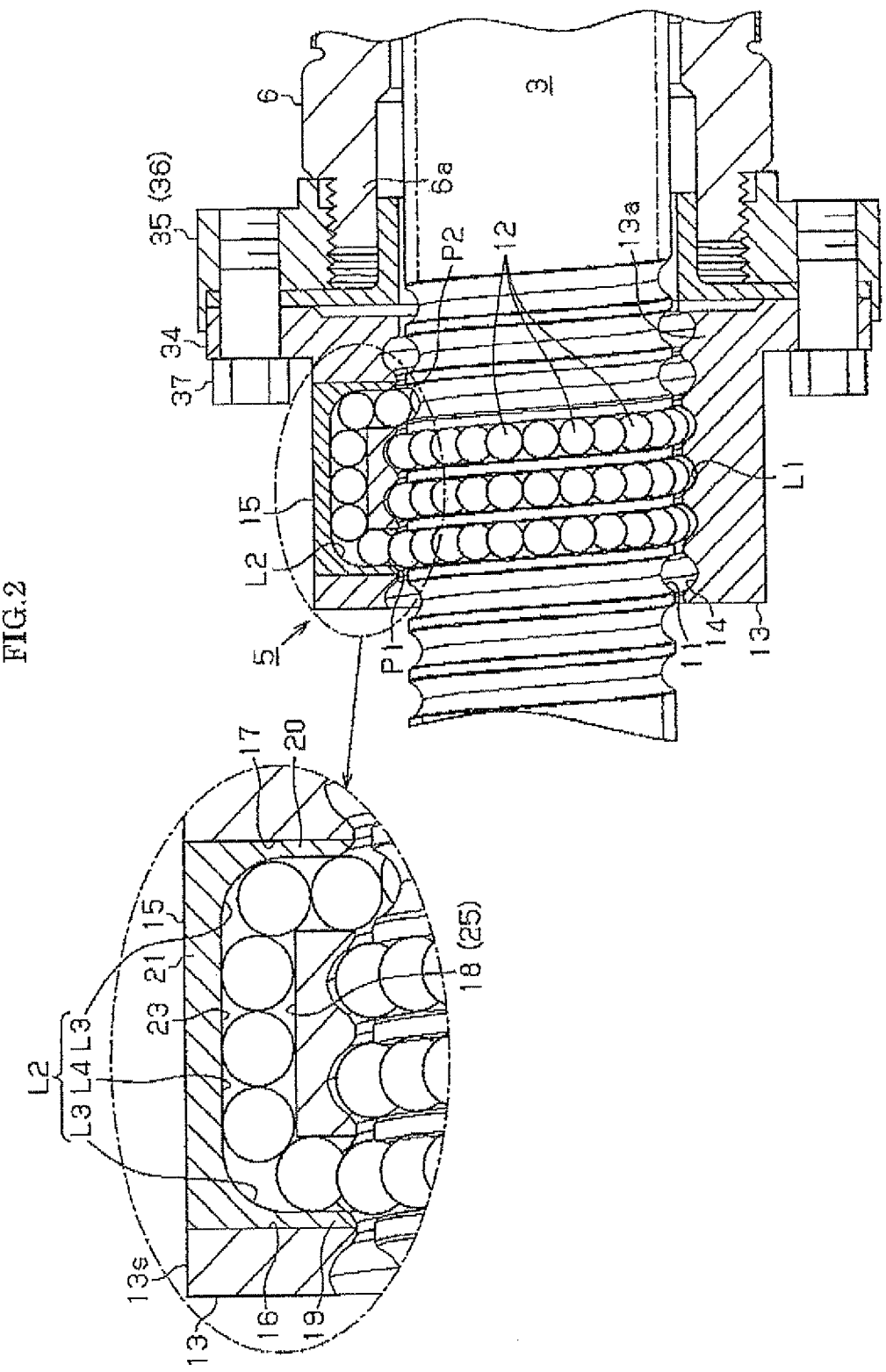
FIG. 2 is an enlarged cross-sectional view showing a portion near a hall screw unit.

More specifically, as shown in FIG. 2, a thread groove 14 corresponding to the thread groove 11 formed in the rack shaft 3 is formed in an inner periphery of the ball screw nut 13 that is formed in a substantially cylindrical shape. The ball screw nut 13 is fitted onto the rack shaft 3 in such a manner that the thread groove 14 is aligned with the thread groove 11 formed in the rack shaft 3. Each ball 12 is arranged within a spiral rolling-element path L1 that is formed by aligning the two thread grooves 11 and 14 with each other.

A return path L2 that opens at two points (connection points P1 and P2) within the thread groove 14 is formed in the ball screw nut 13. The return path L2 serves as a shortcut between the two connection points. P1 and P2 that correspond to the positions at which the return path L2 opens into the rolling-element path L1.

Each ball 12 arranged within the rolling-element path L1 formed between the rack shaft 3 and the ball screw nut 13 rolls within the rolling-element path L1 while receiving a load, due to rotation of the ball screw nut 13 relative to the rack shaft 3. Each ball 12 that has rolled through the rolling-element path L1 passes through the return path L2 formed in the ball screw nut 13, whereby the ball 12 moves between the two connection points P1 and P2 set within the rolling-element path L1, from a downstream-side position to an upstream-side position. Each ball 12 that rolls within the rolling-element path L1 is infinitely circulated through the return path L2, whereby the ball screw unit 5 converts rotation of the ball screw nut 13 into axial movement of the rack shaft 3.

In the ball screw unit 5, the return path L2 is formed by fitting a circulation member 15 that has a function of scooping each ball 12 up from the rolling-element path L1 (and a function of re-delivering the ball 12 into the rolling-element path L1) to the ball screw nut 13.

Figure 3:
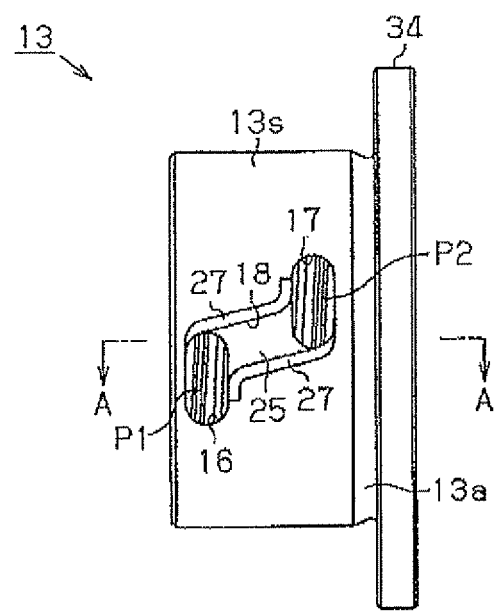
FIG. 3 is a plane view showing a ball screw nut.
Figure 4:
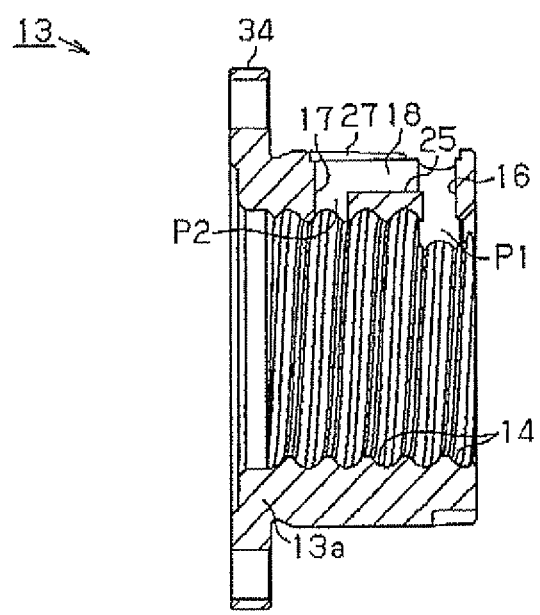
FIG. 4 is a cross-sectional view showing the ball screw nut, taken along the line A-A.

More specifically, as shown in FIGS. 3 and 4, paired fitting holes 16 and 17 that pass through the ball screw nut 13 in the radial direction are formed in the ball screw nut 13 at positions corresponding to the two connection points P1 and P2. The connection points P1 and P2 are formed at positions between which a plurality of windings of the thread groove 14 is present in the axial direction of the ball screw nut 13. The fitting holes 16 and 17 each have a substantially elongate hole shape or a substantially ellipsoidal shape in the cross section. The fitting holes 16 and 17 are formed at positions that are offset from each other in the circumferential direction of the ball screw nut 13 (up-down direction in FIG. 3). A fitting recess portion 18 that connects the fitting holes 16 and 17 to each other is formed in a peripheral face 13s of the ball screw nut 13.

Figure 5:
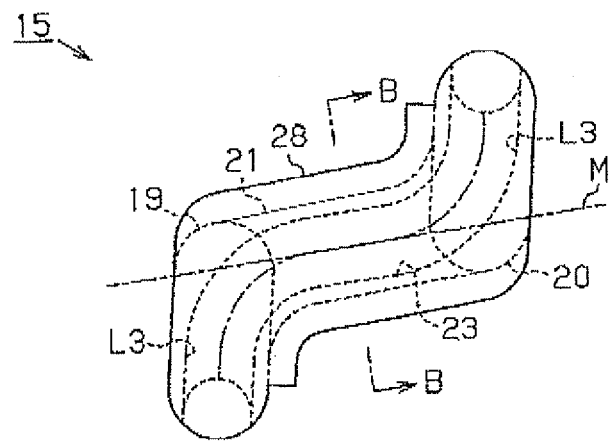
FIG. 5 is a plane view showing a circulation member.
Figure 6:
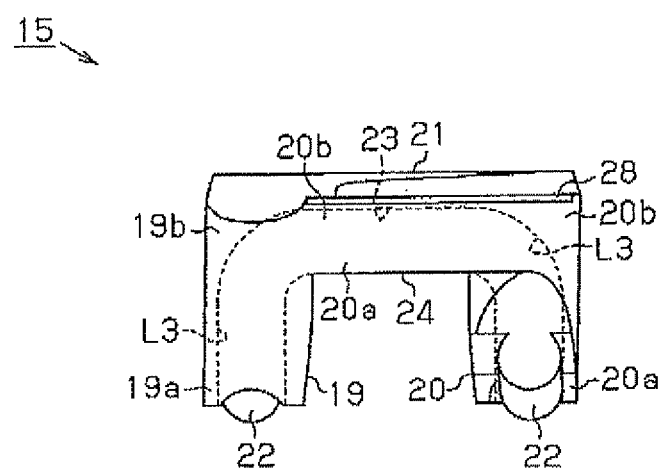
FIG. 6 is a side view showing the circulation member.

As shown in FIGS. 5 and 6, the circulation member 15 has paired fitted portions 19 and 20 that are fitted in the fitting holes 16 and 17, and a connecting portion 21 that provides communication between the fitted portions 19 and 20.

The fitted portions 19 and 20 are cylindrical members each having a substantially elongate hole shape or a substantially ellipsoidal shape in the cross section so that the fitted portions 19 and 20 correspond to the cross-sectional shapes of the fitting holes 16 and 17. Scooping portions 22 used to scoop each ball 12 that has rolled through the rolling-element path L1 up from the rolling-element path L1 to the return path L2 formed by the circulation member 15 are formed at fitted ends 19a and 20a (lower ends in FIG. 6) of the fitted portions 19 and 20. The connecting portion 21 is formed between the fitted portions 19 and 20 so that communication is provided between base ends 19b and 20b (upper ends in FIG. 6) of the fitted portions 19 and 20. The connecting portion 21 is formed in a shape that corresponds to the fitting recess portion 18 so that the connecting portion 21 may be fitted in the fitting recess portion 18.

The fitted portions 19 and 20 are fitted in the corresponding fitting holes 16 and 17 and the connecting portion 21 is fitted in the fitting recess portion 18 that connects the fitting holes 16 and 17 to each other, whereby the circulation member 15 is fitted to the ball screw nut 13. When the circulation member 15 is fitted to the ball screw nut 13, the return path L2 is formed of first paths L3 formed by the fitted portions 19 and 20 fitted in the fitting holes 16 and 17 and a second path L4 formed by the connecting portion 21 fitted in the fitting recess portion 18.

More specifically, the first paths L3 open at the fitted ends 19a and 20a at which the scooping portions 22 are formed into the outside of the fitted portions 19 and 20, and extend from the fitted ends 19a and 20a toward the base ends 19b and 20b substantially along the axes of the fitted portions 19 and 20 (up-down direction in FIG. 6). Each of the first paths L3 is smoothly curved along its entire length, and the base ends 19b and 20b are connected to the second path L4 formed by the connecting portion 21.

When the fitted portions 19 and 20 are fitted in the fitting holes 16 and 17, the first paths L3 formed in the fitted portions 19 and 20 are connected, to the rolling-element path L1. Each ball 12 that rolls within the rolling-element path L1 is scooped up into the first path L3 by one of the scooping portions 22 formed at the fitted ends 19a and 20a.

Figure 7:
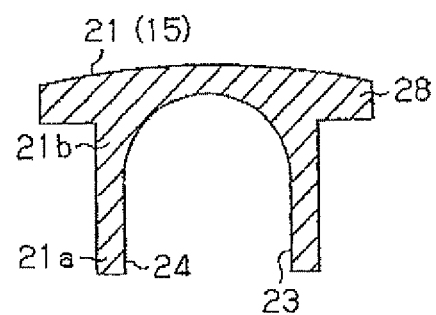
FIG. 7 is a cross-sectional view showing a circulation member (connecting portion), taken along the line B-B in a first embodiment.

As shown in FIGS. 5 to 7, a communication groove 23 that has an opening 24 on a fitted end (lower end in FIG. 7) 21a side of the connecting portion 21 is formed in the connecting portion 21. The communication groove 23 extends along an axis M of the connecting portion 21, whereby both ends of the communication groove 23 are communicated with the first paths L3 formed in the fitted ends 19a and 20a.

Figure 8:
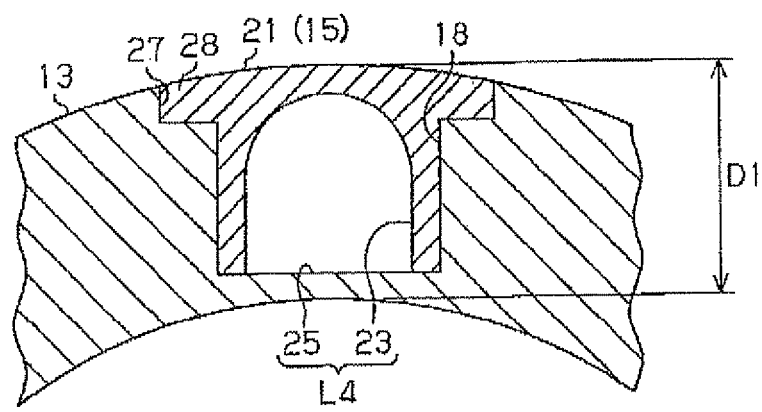
FIG. 8 is a cross-sectional view showing a portion near a fitting recess portion in which a connection portion is fitted in the first embodiment.

When the connecting portion 21 is fitted in the fitting recess portion 18 and the opening 24 of the communication groove 23 that extends along the axis M of the connecting portion 21 is blocked by a bottom portion 25 of the fitting recess portion 18, the second path L4 is formed (see FIG. 8).

Figure 9:
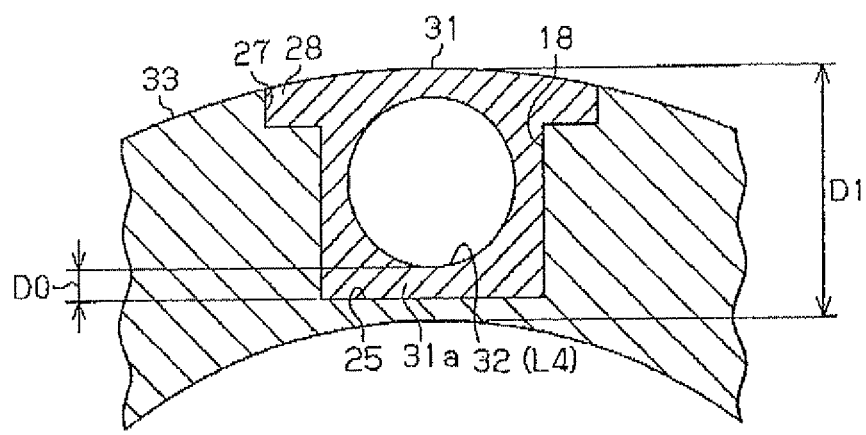
FIG. 9 is a cross-sectional view showing a portion near a fitting recess portion in which a connection portion is fitted in a comparative example.

As a configuration in which the return path L2 is formed by a circulation member that is fitted to the ball screw nut 13, a configuration in which a through-hole 32 is formed along the axis of a connecting portion 31 and the through-hole 32 is used as the second path L4 may be adopted (see FIG. 9). However, reduction in the thickness of the bottom portion 25 of the fitting recess portion 18 is limited because reduction in the strength of the ball screw nut 13 due to formation of the fitting recess portion 18 and deformation of the thread groove 14 due to the reduction in the strength of the ball screw nut 13 need to be avoided. Therefore, in the above-described configuration in which the through-hole 32 is formed in the connecting portion 31 and the through-hole 32 is used as the second path L4, a thickness D1 of the ball screw nut 13 is greater by a thickness D0 of a contact portion (contact portion 31a) of the connecting portion 31 at which the connecting portion 31 contacts the bottom portion 25 of the fitting recess portion 18 than in a configuration in which a through-hole formed in a ball screw nut is used, as described in, for example, JP-A-2006-256414.

However, if the configuration in which the bottom portion 25 of the fitting recess portion 18 blocks the opening 24 of the communication groove 23 formed in the connecting portion 21 is adopted, it is possible to suppress an increase in the thickness D1 of the ball screw nut 13 due to formation of the return path L2 (see FIG. 8). Therefore, according to the first embodiment, it is possible to avoid upsizing of the ball screw nut 13 while ensuring sufficient strength of the ball screw nut 13 and high sound insulation performance.

In the peripheral face 13s of the ball screw nut 13, shallow grooves 27 that communicate with the fitting recess portion 18 are formed so as to surround the perimeter of the fitting recess portion 18. In addition, flanges 28 that correspond to the shallow grooves 27 are formed at a base end (upper end in FIG. 7) 21b of the connecting portion 21.

More specifically, as shown in FIGS. 5 to 7, the flanges 28 are formed so as to project from both sides of the base end 21b in the directions perpendicular to the direction in which the connecting portion 21 is fitted in the fitting recess portion 18 (downward direction in FIG. 7). The flanges 28 extend along the longitudinal direction of the connecting portion 21. When the circulation member 15 is fitted to the ball screw nut 13, the connecting portion 21 is fitted in the fitting recess portion 18. Thus, the flanges 28 are fitted in the shallow grooves 27 formed in the peripheral face 13s of the ball screw nut 13.

When the flanges 28 are fitted in the shallow grooves 27 formed in the perimeter of the fitting recess portion 18, the position of the circulation member 15 is determined in the fitting recess portion 18. When the flanges 28 arranged in the shallow grooves 27 are swaged, the circulation member 15 fitted to the ball screw nut 13 as described above is fixed to the ball screw nut 13 in a state where the flanges 28 are flush with the peripheral face 13s of the ball screw nut 13.

As shown in FIG. 2, an annular disk-shaped flange 34 that projects in the radial direction is formed at an axial end 13a of the ball screw nut 13, and an annular disk-shaped flange 35 that corresponds to the flange 34 of the ball screw nut 13 is formed at an axial end 6a of the motor shaft 6. In the first embodiment, the flange 35 on the motor shaft 6 side is formed by screwing a flange member 36 formed separately from the motor shaft 6 onto the axial end 6a of the motor shaft 6. When the flanges 34 and 35 are fastened together with bolts 37, the ball screw nut 13 that forms a rotation input portion of the ball screw unit 5 is connected to the motor shaft 6 that serves as a motor output shaft.

In the EPS 1, when the ball screw nut 13 that is coaxially connected to the motor shaft 6 rotates together with the motor shaft 6, rotation of the motor 4 that serves as a drive source is input in the ball screw unit 5. The EPS 1 is configured to apply an axial pressing force obtained based on the motor torque to a steering system as an assist force by converting rotation of the motor 4 into axial movement of the rack shaft 3 with the use of the ball screw unit 5.

According to the first embodiment, the following effects are obtained.

1) The fitting recess portion 18 that connects the fitting holes 16 and 17 to each other is formed in the peripheral face 13s of the ball screw nut 13. The circulation member 15 includes paired fitted portions 19 and 20 that are fitted in the fitting holes 16 and 17, and the connecting portion 21 that connects the fitted portions 19 and 20. The communication groove 23 that has the opening 24 on the fitted end (lower end in FIG. 7) 21a side of the connecting portion 21 and that extends along the axis M of the connecting portion 21 is formed in the connecting portion 21. When the connecting portion 21 is fitted in the fitting recess portion 18 and the opening 24 of the communication groove 23 formed in the connecting portion 21 is blocked by the bottom portion 25 of the fitting recess portion 18, the second path L4 that forms the return path L2 together with the first paths L3 formed in the fitted portions 19 and 20 is formed.

As described above, because the configuration in which the circulation member 15 fitted to the ball screw nut 13 forms the return path L2 is adopted, the likelihood that a step is formed within the return path L2 is minimized. When the circulation member 15 is fitted to the ball screw nut 13, the connecting portion 21 that connects the fitted portions 19 and 20 is fitted in the fitting recess portion 18 formed the ball screw nut 13. Thus, the range of positions that may be occupied by the fitted portions 19 and 20 within the fitting holes 16 and 17 is significantly limited. Thus, it is possible to suppress displacement of the fitted portions 19 and 20 within the fitting holes 16 and 17 due to, for example, inclination of the circulation member 15 that may occur when the circulation member 15 is fitted to the ball screw nut 13. As a result, it is possible to easily ensure proper fitting of the circulation member 15.

As described above, because the configuration in which the opening 24 of the communication groove 23 formed in the connecting portion 21 is blocked by the bottom portion 25 of the fitting recess portion 18 is adopted, it is possible to suppress an increase in the thickness D1 of the ball screw nut 13 clue to formation of the return path L2. As a result, it is possible to downsize the ball screw nut 13, while ensuring sufficient strength of the ball screw nut 13 to avoid deformation of the thread groove 14.

2) The flanges 28 that contact the perimeter of the fitting recess portion 18 and that are used to determine the position of the circulation member 15 that is fitted in the fitting recess portion 18 are formed in the circulation member 15.

With the configuration described above, it is possible to easily and reliably determine the position of the circulation member 15 within the fitting recess portion 18. As a result, it is possible to more properly fit the circulation member 15 to the ball screw nut 13.

3) When, the flanges 28 are swaged within the shallow grooves 27 formed in the peripheral face 13s of the ball screw nut 13, the circulation member 15 is fixed to the ball screw nut 13.

With the configuration described above, it is possible to more reliably fit the circulation member 15 to the ball screw nut 13. As a result, it is possible to maintain the state where the circulation member 15 is appropriately fitted to the ball screw nut 13.

Next, a second embodiment of the invention will be described with reference to the accompanying drawings.

The same portions as those in the first embodiment will be denoted by the same reference numerals, and descriptions thereof will not be provided below.

Figure 10:
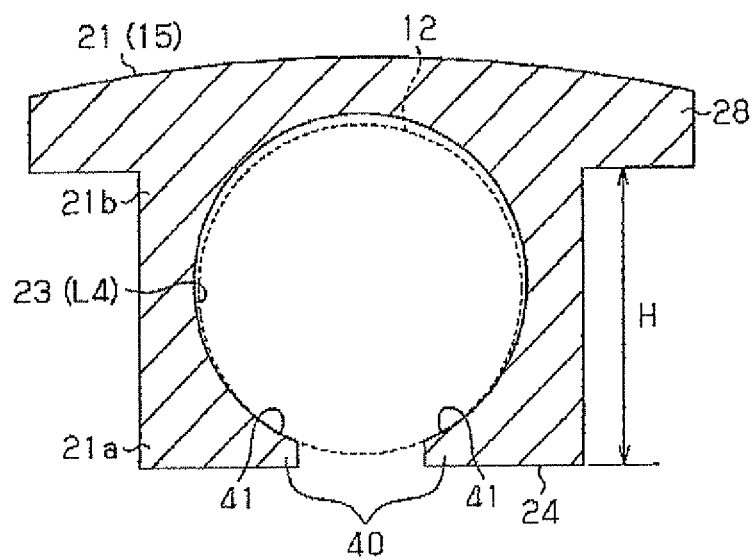
FIG. 10 is a cross-sectional view showing a circulation member (connecting portion), taken along the line B-B in a second embodiment.

As shown in FIG. 10, paired flanges 40 are formed at the opening 24 of the communication groove 23 formed in the connecting portion 21. The flanges 40 face each other, project from the fitted ends 21a of the connecting portion 21 inward of the communication groove 23, and extend along the longitudinal direction of the communication groove 23. Within a space that is formed when the opening 24 of the communication groove 23 is blocked by the bottom portion 25 of the fitting recess portion 18, each ball 12 passes through the second path L4 while being supported by the flanges 40.

As described above, because the flanges 28 formed at the base end 21b of the connecting portion 21 are fitted in the shallow grooves 27 formed in the perimeter of the fitting recess portion 18, it is possible to easily and reliably determine the position of the circulation member 15 within the fitting recess portion 18.

Figure 11:
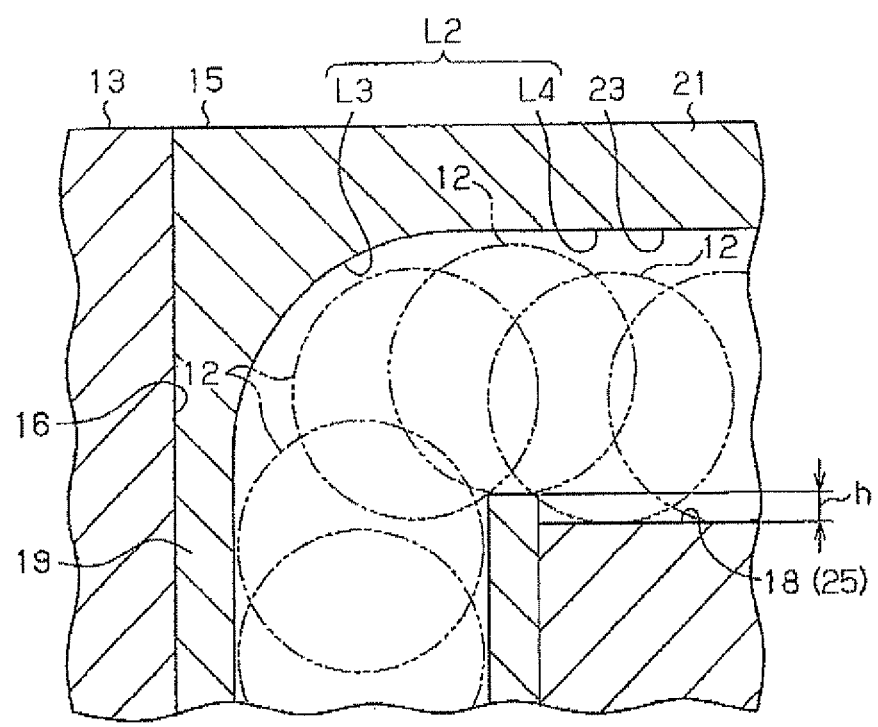
FIG. 11 is a view showing a locus of each ball when a step is formed in a connection portion between a first path and a second path.

However, in actuality, a fitted length H (height, see FIG. 10) of the connecting portion 21 varies due to a tolerance. Therefore, as shown in FIG. 11, even if the position of the circulation member 15 is appropriately determined by the flanges 28, a step h may be formed in the connecting place between the first path L3 and the second path L4. In the configuration according to the first embodiment in which each ball 12 that moves within the second path L4 is supported by the bottom portion 25 of the fitting recess portion 18 that blocks the opening 24 of the communication groove 23, when the ball 12 passes the step h, the ball 12 hits the step h and the bottom portion 25. As a result, smooth passage of the ball 12 is hindered, and abnormal noise or vibration may be generated.

Figure 12:
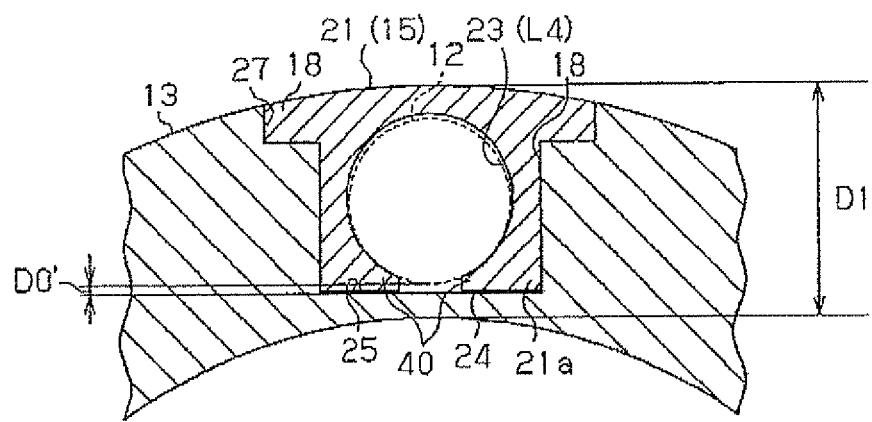
FIG. 12 is a cross-sectional view showing a portion near a fitting recess portion in which a connection portion is fitted in the second embodiment.

As shown in FIG. 12, each ball 12 is supported by the flanges 40 that are formed at the opening 24 of the communication groove 23. With this configuration, it is possible to prevent formation of the step h in the connection portion between the first path L3 and the second path L4.

That is, the space formed by blocking the opening 24 of the communication groove 23 by the bottom portion 25 of the fitting recess portion 18, that is, the space that forms the second path L4 in the first embodiment, is divided by the flanges 40. An inner side space (upper side space in FIG. 12) of the communication groove 23 that is formed by the flanges 48 is used as the second path L4. Thus, even if the fitted length H (see FIG. 10) of the connecting portion 21 varies, the step h (see FIG. 11) is not formed in the connection portion between the second path L4 and the first path L3.

The flanges 40 are formed in such a manner that the inner faces (upper faces in FIG. 12) that form support faces 41 for supporting each ball 12 are formed in curved faces that conform to the shape of the surface of each ball 12, that is, a spherical face.

According to the second embodiment, it is possible to obtain the following effects in addition to the effects 1) to 3) described in the first embodiment.

4) The flanges 40 that support each ball 12 that passes through the second path L4 are formed at the opening 24 of the communication groove 23.

With the configuration described above, even if the fitted length H of the connecting portion 21 varies, a step is not formed in the connection portion between the first path L3 and the second path L4. As a result, it is possible to effectively suppress generation of abnormal noise and vibration.

5) The support faces 41 of the flanges 40 that support each ball 12 are formed as curved faces that conform to the spherical face of each ball 12.

With the configuration described above, each ball 12 moves on the support faces 41 more smoothly. The thickness of each of the flanges 40 is reduced from the base end portion toward the tip end. Therefore, it is possible to minimize a thickness D0' of a bottom portion that may be formed due to formation of the flanges 40. As a result, it is possible to suppress an increase in the thickness D1 of the ball screw nut 13 while ensuring sufficient strength.

The embodiments described above may be modified as below.

Figure 13:
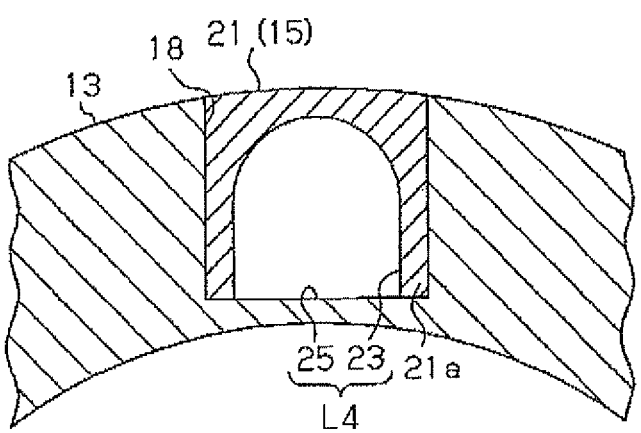
FIG. 13 is a cross-sectional view showing a portion near a fitting recess portion in which a connection portion is fitted in another example.
Figure 14:
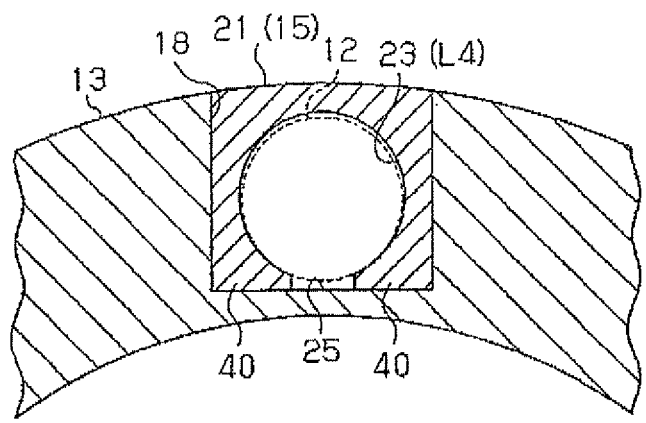
FIG. 14 is a cross-sectional view showing a portion near a fitting recess portion in which a connection portion is fitted in another example.

In each embodiment described above, when the flanges 28 formed at the connecting portion 21 are fitted in the shallow grooves 27 formed in the perimeter of the fitting recess portion 18, the position of the circulation member 15 is determined within the fitting recess portion 18. However, such flanges 28 need not be formed. That is, as shown in FIG. 13, the position of the circulation member 15 may be determined within the fitting recess portion 18 when the fitted ends 21a of the connecting portion 21 contact the bottom portion 25 of the fitting recess portion 18. Thus, even when the fitted length of the connecting portion 21 varies, it is possible to suppress formation of a step in the connection portion between the first path. L3 and the second path L4. Also, as shown in FIG. 14, the position of the circulation member 15 may be determined within the fitting recess portion 18 when the flanges 40 contact the bottom portion 25 of the fitting recess portion 18. Thus, it is possible to more reliably determine the position of the circulation member 15 within the fitting recess portion 18.

In the configuration in which the flanges 28 are not formed as shown in FIGS. 13 and 14, it is not possible to fix the circulation member 15 by swaging. However, for example, new flanges used exclusively for "fixing the circulation member 15 by swaging" may be formed. That is, the new flanges may be swaged after the position of the circulation member 15 is determined by the fitted ends 21a of the connecting portion 21 or the flanges 40. Alternatively, a top face of the circulation member may be directly swaged.

Figure 15:
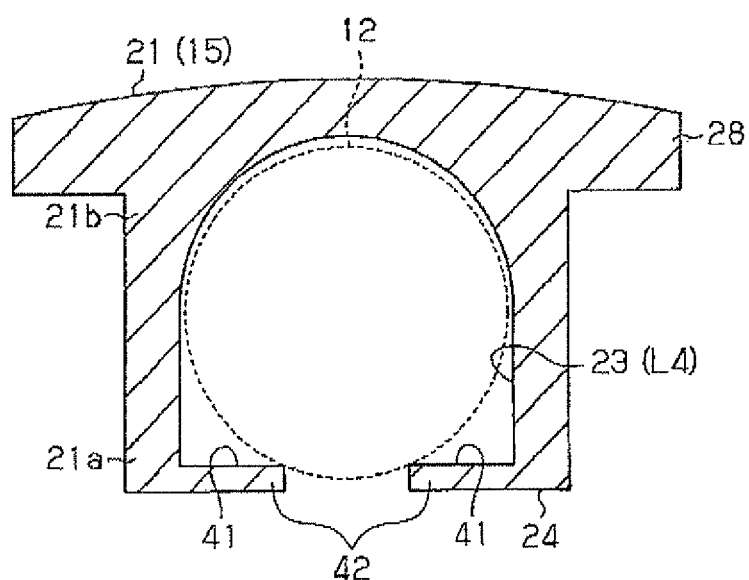
FIG. 15 is a cross-sectional view showing a circulation member (connecting portion), taken along the line B-B in another example.

In the second embodiment, the support faces 41 of the flanges 40 that support each ball 12 are formed in the curved faces that conform to the spherical face of each ball 12. However, as shown in FIG. 15, paired flange 42 of which the support faces 41 are flat faces may be formed. With this configuration, it is possible to suppress formation of a step in the connection portion between the first path L3 and the second path L4, as in the second embodiment.

Figure 16:
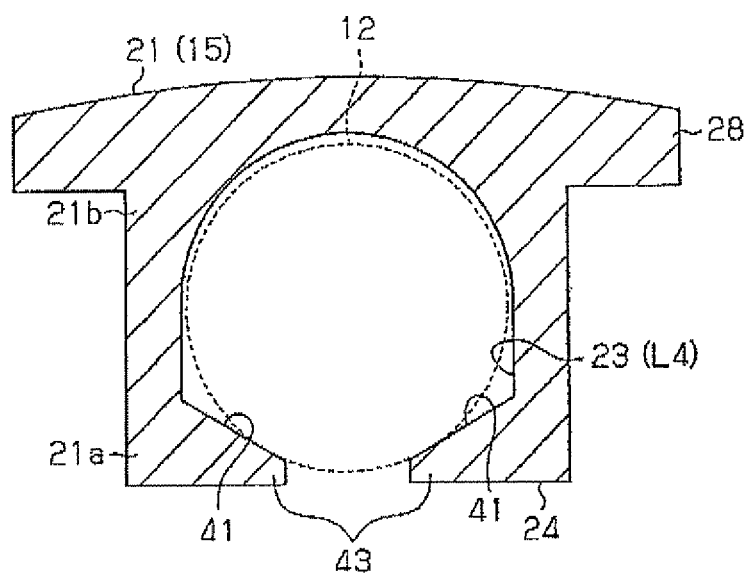
FIG. 16 is a cross-sectional view showing a circulation member (connecting portion), taken along the line B-B in another example.

As shown in FIG. 16, paired flanges 43 of which the support faces 41 are inclined faces may be formed, and each ball 12 may be supported between the inclined faces that form a V-shape. With this configuration as well, each ball 12 smoothly moves on the support faces 41. Because the thickness of each of the flanges 43 is reduced from the base end portion toward the tip end, it is possible to minimize an increase in the thickness of a bottom portion that may be formed due to formation of the flanges 43. As a result, it is possible to suppress an increase in the thickness D1 of the ball screw nut 13 while ensuring sufficient strength.

Figure 17:
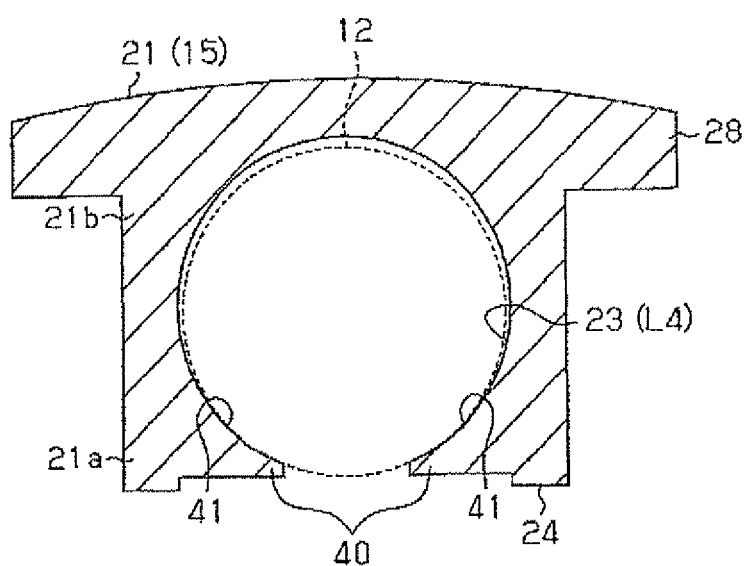
FIG. 17 is a cross-sectional view showing a circulation member (connecting portion), taken along the line B-B in another example.

In the second embodiment, the flanges 40 are formed so as to face each other and project from the fitted ends 21a of the connecting portion 21 inward of the communication groove 23. However, the configuration of the flanges 40 is not limited to this. As shown in FIG. 17, the flanges 40 may be formed in such a manner that the flanges 40 are arranged within the communication groove 23. With this configuration, even when the position of the circulation member 15 is determined when the fitted ends 21a of the connecting portion 21 contact the bottom portion 25 of the fitting recess portion 18 (see FIG. 13), it is possible to reduce a load that is applied to the flanges 40. As a result, it is possible to suppress deformation of the flanges 40, and ensure smooth movement of each ball 12 within the second path L4.

In each embodiment, the invention is applied to the ball screw unit 5 for an EPS. However, the invention may be applied to devices other than an EPS.

What is claimed is:

1. A ball screw unit, comprising:
a threaded shaft that has an outer periphery in which a thread groove is formed;
a ball screw nut that has an inner periphery in which a thread groove is formed;

a spiral rolling-element path that is formed by aligning the thread groove of the threaded shaft with the thread groove of the ball screw nut; and a plurality of balls that are arranged within the rolling-element path, wherein a return path that serves as a shortcut between two points set within the rolling-element path and that allows infinite circulation of each of the balls that roll within the rolling-element path is formed in the ball screw nut, wherein the return path is formed by fitting a circulation member in a pair of fitting holes that pass through the ball screw nut in a radial direction of the ball screw nut and that are formed so as to correspond to the two points set within the rolling-element path, wherein a fitting recess portion that connects the fitting holes to each other is formed in a peripheral face of the ball screw nut, wherein the circulation member includes a pair of fitted portions that are fitted in the respective fitting holes, and a connecting portion that connects the fitted portions, wherein the return path is formed of first paths that are formed by the respective fitted portions fitted in the fitting holes, and a second path that is formed by the connecting portion that is fitted in the fitting recess portion, and wherein the second path is formed when the connecting portion is fitted in the fitting recess portion so that an opening is formed along the entire length of a communication groove that is formed along an axis of the connecting portion such that the opening is blocked by a bottom portion of the fitting recess portion.

2. The ball screw unit according to claim 1, wherein a pair of inner flanges that support each of the balls that pass through the second path is formed at the opening of the communication groove.

3. The ball screw unit according to claim 2, wherein a face of each of the inner flanges that supports each of the balls is formed in a curved face that conforms to each of the balls.

4. The ball screw unit according to claim 3, wherein a position of the circulation member is determined when the inner flanges contact the bottom portion of the fitting recess portion.

5. An electric power steering apparatus comprising the ball screw unit according to claim 4.

6. The ball screw unit according to claim 3, wherein the circulation member has an outer flange that contacts a perimeter of the fitting recess portion to determine a position of the circulation member.

7. An electric power steering apparatus comprising the ball screw unit according to claim 6.

8. An electric power steering apparatus comprising the ball screw unit according to claim 3.

9. The ball screw unit according to claim 2, wherein a position of the circulation member is determined when the inner flanges contact the bottom portion of the fitting recess portion.

10. An electric power steering apparatus comprising the ball screw unit according to claim 9.

11. The ball screw unit according to claim 2, wherein the circulation member has an outer flange that contacts a perimeter of the fitting recess portion to determine a position of the circulation member.

12. An electric power steering apparatus comprising the ball screw unit according to claim 11.

13. An electric power steering apparatus comprising the ball screw unit according to claim 2.

14. The ball screw unit according to claim 1, wherein the circulation member has an outer flange that contacts a perimeter of the fitting recess portion to determine a position of the circulation member.

15. An electric power steering apparatus comprising the ball screw unit according to claim 14.

16. An electric power steering apparatus comprising the ball screw unit according to claim 1.

17. The ball screw unit according to claim 1, wherein the connecting portion and the fitting recess portion are separable from one another.

18. The ball screw unit according to claim 1, wherein, in a cross-sectional view normal to the length of the communication groove, a center of the opening is aligned with a center of the communication groove.

* * * * *